Oct. 17, 1950     E. K. MADAN ET AL     2,525,921

PLASTIC LENS

Filed Nov. 19, 1947

EDWARD K. MADAN
ROBERT W. MADAN
*INVENTORS*

BY *Robt Meyer*
*attorney*

Patented Oct. 17, 1950

2,525,921

UNITED STATES PATENT OFFICE 2,525,921

PLASTIC LENS

Edward K. Madan and Robert W. Madan, Maplewood, N. J., assignors to The Emeloid Co. Incorporated, Arlington, N. J., a corporation of New Jersey Application November 19, 1947, Serial No. 786,930

4 Claims. (Cl. 88—57)

This invention relates to lens and more particularly to a magnifying lens for use in connection with television receiving sets to magnify the image produced on the tube, or for magnifying the images produced by any form of cathode ray or similar tube.

The image producing tubes, or cathode ray tubes of television sets and other similar uses are very expensive, and their cost increases materially with an increase in size, and the size of the produced image is dependent upon the size of the tube, also the cost of the companion equipment increases with the increase of the size of the image producing tube with the result that a television set which will produce an image or picture of practical easily viewed size is of a prohibitive cost for the average householder.

The cost of ground crystal magnifying lens of suitable size to magnify the images produced by a television set employing a practical size tube, from a cost standpoint, to a practical, easily viewed size is also comparatively high so that little could be gained in cost reduction of television sets by employment of a ground crystal lens with a small size tube.

An object of the present invention is to provide a lens suitable and particularly adaptable for use in a television set, or in connection with any form of cathode ray or similar tube, which lens will magnify the images produced by the tube to a desired size and which lens may be manufactured for only a fraction of the cost of a ground crystal lens.

More specifically, the present invention comprehends the production of a lens made of thermoplastic such as thermoplastic methyl methacrylate resin, or other similar thermoplastic of high clarity, and dimensional stability, which is weather resistant, has low moisture absorbtion and is shatter resistant. (Two such thermoplastics are Lucite and Polystyrene, both commercial products now on the market.) The lens is molded in one piece, molded or pressed in two pieces or otherwise suitably produced to provide a hollow body lens having a convex front and flat back or a convex front and a convex back. The space between the front and back or the hollow in the body is filled with a liquid, preferably a mineral oil which has the same refractive index as the refractive index of the thermoplastic of which the lens body is formed.

With these and other objects in view, as may appear from the accompanying specification, the invention consists of various features of construction and combination of parts, which will be first described in connection with the accompanying drawings, showing a plastic lens of a preferred form embodying the invention, and the features forming the invention will be specifically pointed out in the claims.

Figure 1:
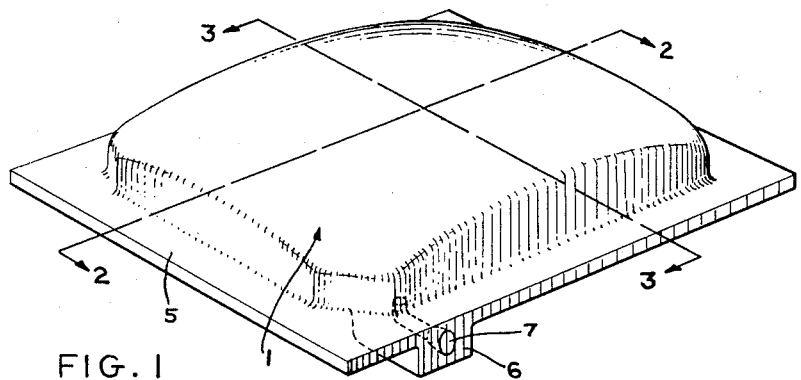
Figure 1 is a perspective view of the improved lens.
Figure 2:
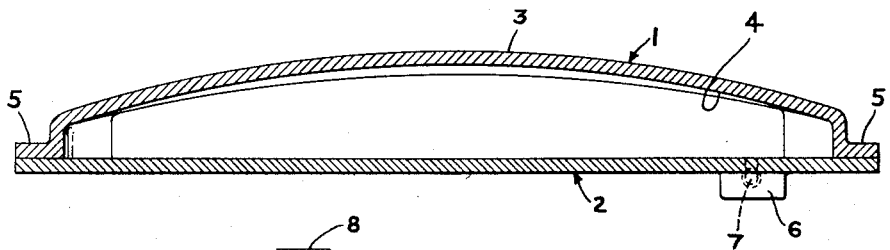
Figure 2 is a section through the lens taken on the line 2—2 of Figure 1.
Figure 3:
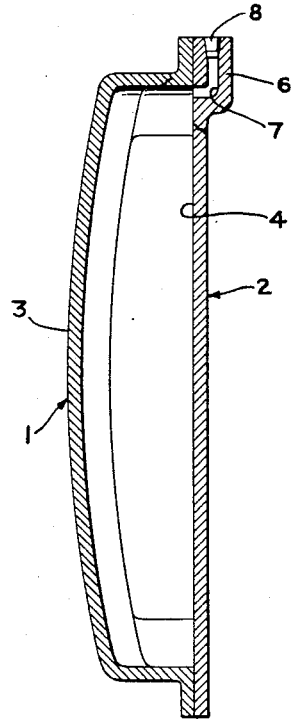
Figure 3 is a section through the lens taken on the line 3—3 of Figure 1.

Referring more particularly to the drawings, the improved lens as shown in Figures 1 to 3 of the drawings comprises the front piece 1 and the back plate or back piece 2. The front piece 1 may be pressed, molded or otherwise formed of a thermoplastic such as thermoplastic methyl methacrylate resin or other similar thermoplastic which is very clear, that is, has a high degree of clarity and which has dimensional stability so that it may be held true to the shape assumed in the forming of the piece. The front piece 1 has a convex outer surface 3 and it is shaped to provide a concave inner surface which when the back plate 2 is attached to the front piece will form a hollow space 4. The front piece 3 is shown as provided with an annular flange 5 completely surrounding it. The back plate 2 may be pressed, molded or otherwise suitably formed of clear dimensional stable thermoplastic of the same type and nature of the thermoplastic of which the front piece 1 is formed. This plate 2, which is flat, is cemented, thermally bonded or otherwise attached to the flange 5 of the front piece 1 so as to form an air and fluid tight joint between the front piece 1 and back plate 2. In the form shown in Figures 1 to 3 of the drawings the back plate 2 has an enlarged boss or enlarged portion 6 formed thereon which is provided with a filling passage 7. The filling passage 7 opens out through the outer edge of the boss 6 and into the hollow space 4 between the front piece 1 and the rear plate 2 so that the space 4 may be filled with a liquid. The liquid with which the space 4 is filled may be of any liquid which has the same or very close to the same refractive index as the refractive index of the plastic of which the front piece 1 and back plate 2 are formed. A clear, transparent mineral oil is preferable for use as the filling liquid. After the hollow space 4 is filled with the liquid the filling opening or passage 7 is closed by a closure plug 8 which may be cemented into the opening, threaded therein or otherwise suitably attached so as to form a tight closure for the passage 7. As clearly shown in Figure 3 of the drawings, the plug 8 is much smaller or shorter than the passage 7 so that a major portion of this passage 7 will be left unfilled to form an expansion pocket or space to accommodate any expansion of the liquid with which the space 4 is filled under heat variances to which it may be subjected.

Figure 4:
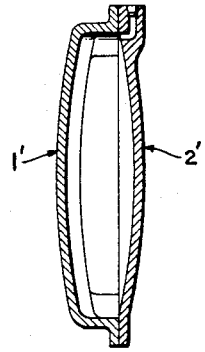
Figure 4 is a section through a modified form of the lens.

Figure 4 of the drawings shows a slightly modified construction of the lens, and in this form both the front piece 1' and the back plate 2' have convex outer surfaces. Otherwise the construction of the modified form of the lens is the same as that shown in Figures 1 to 3 of the drawings. That is, the front and back pieces 1' and 2' are cemented together around their edges and provide the hollow space between them which is filled with the liquid having the same or approximately the same refractive index as the plastic from which the front and rear pieces are made or formed.

The front piece and back plate or back piece of the lens may be formed by thermal pressure forming means from sheet stock, may be molded in dies with the usual method of thermal molding of plastics of this type or either one of them may be molded and used with a pressed or formed other element without departing from the spirit of the present invention.

It will be understood that the invention is not to be limited to the specific construction or arrangement of parts shown, but that they may be widely modified within the invention defined by the claims.

What is claimed is:

1. As a new article of manufacture, a magnifying lens for magnifying the images produced by cathode ray or similar tubes, comprising a hollow body of a thermoplastic of high clarity and dimensional stability, said hollow body filled with a liquid of approximately the same refractive index as the refractive index of the thermoplastic body, said body provided with an offset filling opening formed on the outer surface of the body and extending into the hollow portion thereof, a closure plug in said filling opening, said filling opening being of such size that when closed by said closure plug a pocket is left which communicates with the hollow of the body and forms an air or expansion chamber open to the hollow.

2. As a new article of manufacture, a magnifying lens for magnifying the images produced by cathode ray or similar tubes, comprising a front piece having a convex outer face and a concave inner face and made of a thermoplastic of high clarity and dimensional stability, a back plate made of a thermoplastic of high clarity and dimensional stability, said front piece and back plate having contacting bonded engaging connection around their edges to provide an air and liquid tight hollow body, said frontpiece element of said hollow body provided with an offset filling opening formed on the outer surface thereof and extending into said hollow, a closure plug in said filling opening, said filling opening being of such size that when closed by said closure plug a pocket is left which communicates with the hollow of the body, the hollow of said body being filled with a liquid having approximately the same refractive index as the refractive index of the thermoplastic body.

3. As a new article of manufacture, a magnifying lens for magnifying the images produced by cathode ray or similar tubes, comprising a front piece having a convex outer face and a concave inner face and made of a thermoplastic of high clarity and dimensional stability, a back plate made of a thermoplastic of high clarity and dimensional stability, said front piece and back plate having contacting bonded engaging connection around their edges to provide an air and liquid tight hollow body, said hollow body filled with a liquid having approximately the same refractive index as the refractive index of the thermoplastic body, said front piece having an offset filling opening formed on the outer surface thereof, a closure plug in said filling opening, said filling opening in the assembled structure to communicate with the hollow of the body and form an air and expansion chamber open to the hollow of the body.

4. As a new article of manufacture, a magnifying lens for magnifying the images produced by cathode ray or similar tubes, comprising a front piece having a convex outer face and a concave inner face and made of a thermoplastic of high clarity and dimensional stability, a back plate made of a thermo-plastic of high clarity and dimensional stability, said front piece and back plate having contacting bonded engaging connection around their edges to provide an air and liquid tight hollow body, said hollow body filled with a liquid having approximately the same refractive index as the refractive index of the thermoplastic body, said back plate having an offset filling opening on the outer surface thereof and extending into said hollow body, a closure plug in said filling opening, said filling opening in the assembled structure to communicate with the hollow of the body and form an air or expansion chamber open to the hollow.

EDWARD K. MADAN.
ROBERT W. MADAN.

REFERENCES CITED

The following references are of record in the file of this patent:

UNITED STATES PATENTS

| Number | Name | Date |
| --- | --- | --- |
| 57,602 | Warden | Aug. 28, 1866 |
| 60,109 | Woodward | Nov. 27, 1866 |
| 1,569,973 | Goettert | Jan. 19, 1926 |
| 1,964,861 | Smith | July 3, 1934 |
| 2,093,288 | Ogloblinsky | Sept. 14, 1937 |
| 2,165,078 | Tonlon | July 4, 1939 |
| 2,295,802 | Nicoll | Sept. 15, 1942 |
| 2,297,240 | Neumann | Sept. 29, 1942 |
| 2,300,251 | Flint | Oct. 27, 1942 |

FOREIGN PATENTS

| Number | Country | Date |
| --- | --- | --- |
| 734,657 | France | Aug. 2, 1932 |